March 2, 1937.  H. D. GRANT  2,072,586
ROTARY FILTER
Filed Sept. 24, 1934   2 Sheets-Sheet 1
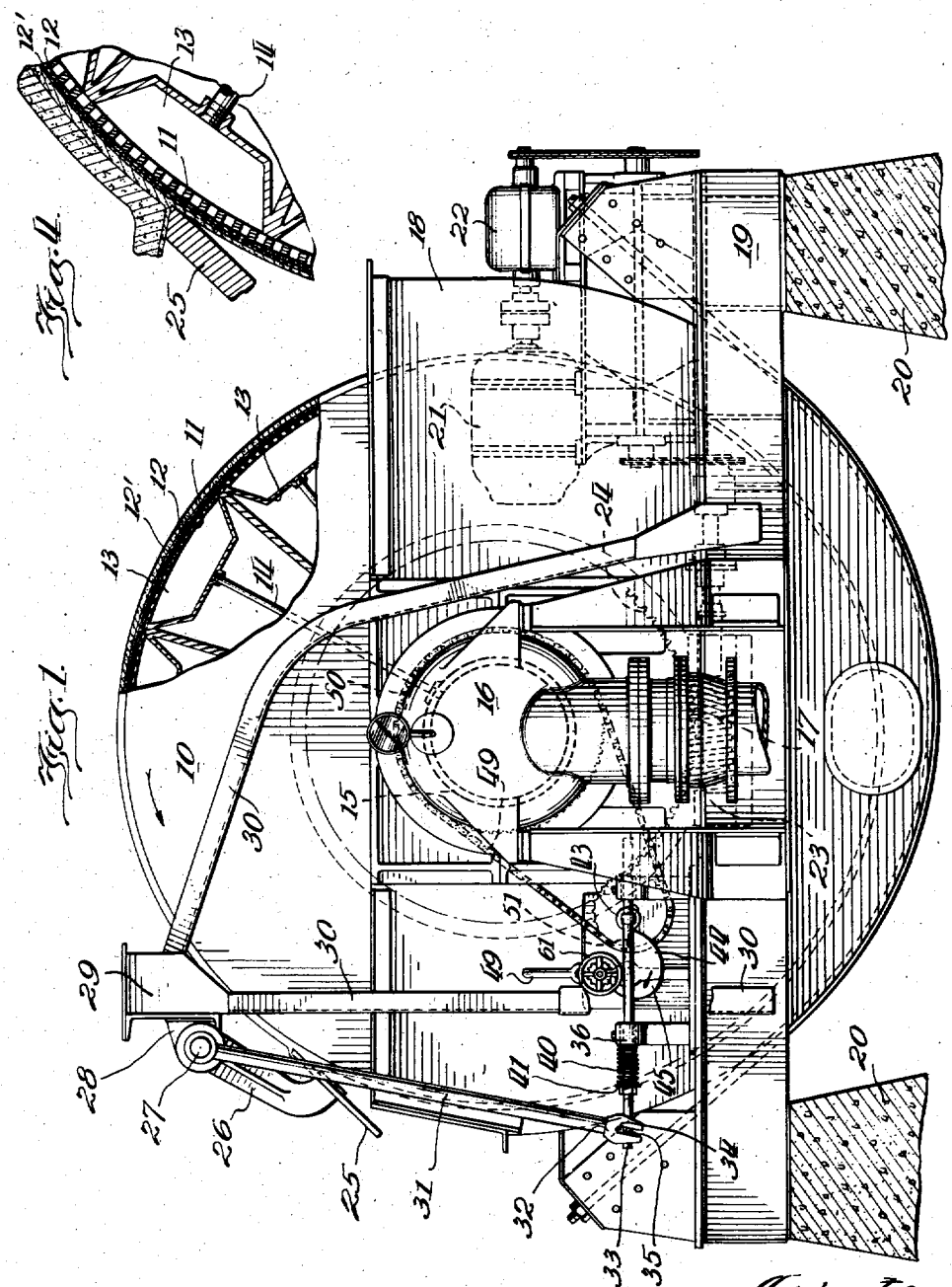
Inventor:
Howard D. Grant

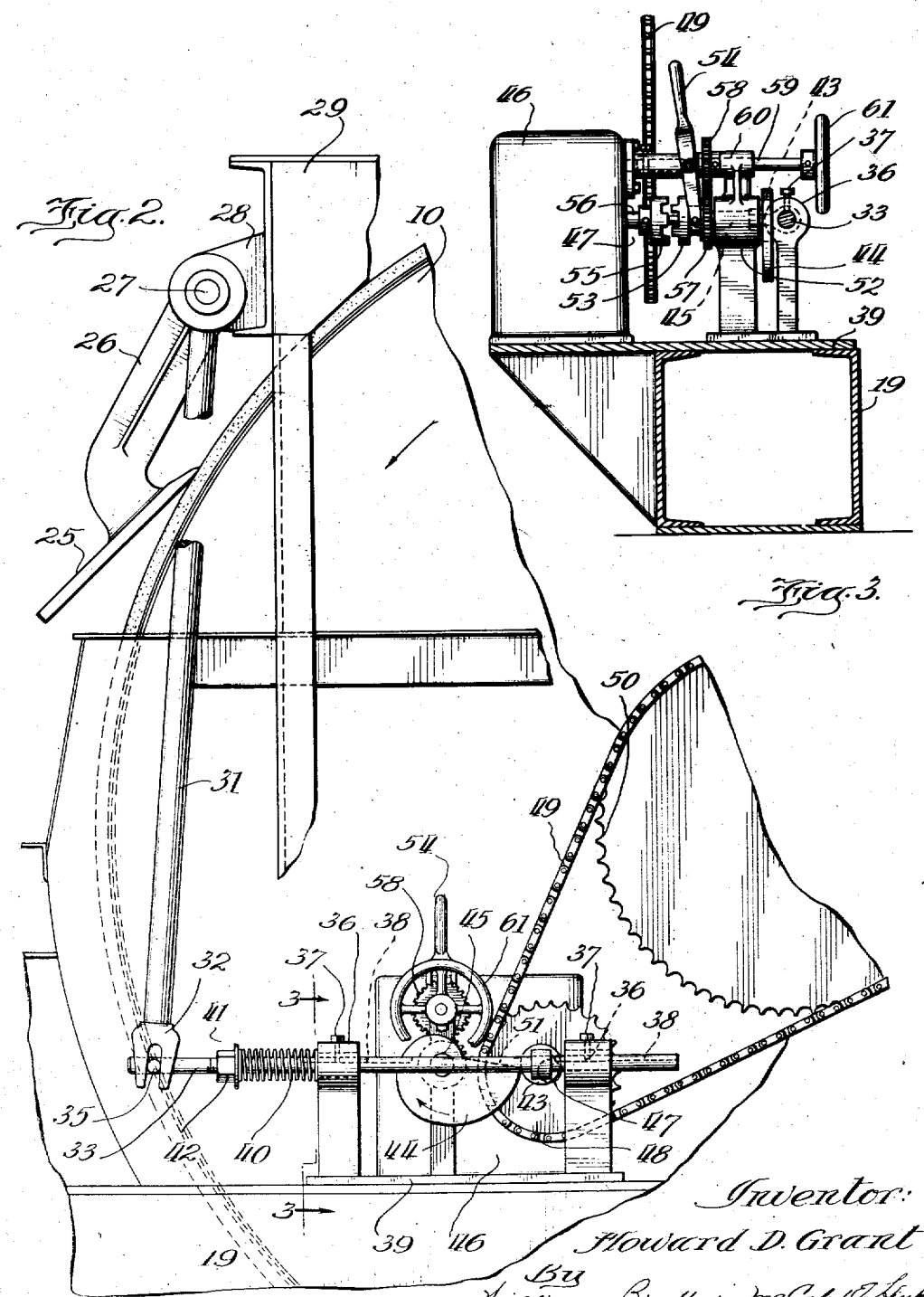

Patented Mar. 2, 1937

2,072,586

UNITED STATES PATENT OFFICE 2,072,586

ROTARY FILTER

Howard D. Grant, Grand Rapids, Mich., assignor to Swenson Evaporator Company, Harvey, Ill., a corporation of Illinois Application September 24, 1934, Serial No. 745,190

1 Claim. (Cl. 210—201)

This invention relates to filters, particularly to rotary filters.

One of the objects of the present invention is to provide an improved rotary filter.

A further object of the invention is to provide an improved knife or scraper mechanism adapted progressively to approach nearer and nearer the surface of the filter to effect removal of material therefrom.

A further object of the invention is to provide a knife mechanism which is adapted to approach progressively toward the filtering surface and finally to retract therefrom automatically.

Other objects, advantages and capabilities of the invention will appear from the following description of a preferred embodiment thereof, taken in conjunction with the accompanying drawings, in which Figure 1 is a side elevation of a rotary filter embodying my invention;

Fig. 2 is a fragmentary elevational view showing the knife-operating mechanism on a larger scale, Fig. 3 is a sectional detail view taken on the line 3—3 of Fig. 2, and Fig. 4 is a sectional detail view showing the knife edge in operation.

Referring to the drawings, the reference numeral 10 designates a filter drum of known type in which the filtering surface is provided around the cylindrical wall of the drum. The cylindrical wall may suitably comprise a perforated wall 11 over which is spread a fine wire mesh screen 12 supporting and covered by a suitable fabric 12'. On the inner side of the perforated wall 11 the filter drum is provided with pockets 13 which communicate through pipes 14 with a hollow trunnion 15. The hollow trunnion 15 communicates with the interior of a bearing member 16, which in turn communicates with a discharge pipe 17 to which vacuum may be applied in the usual manner. It will be understood that the drum 10 is supported upon the trunnion 15 and another trunnion on the opposite side. The filter drum 10 is partly immersed in liquid contained in a tank 18, which preferably conforms fairly closely to the shape of the drum. This tank is supported on a rectangular frame 19, which in turn rests on suitable foundations 20.

In the normal operation of the filter, vacuum is applied to the pipe 17 and the drum 10 is rotated by suitable mechanism. The drive of the drum may suitably be by means of an electric motor 21, gear reducing unit 22, intermediate appropriate drive elements, worm 23 and worm gear 24. The drive for the drum is located on the opposite side from that shown in Fig. 1 and is, consequently, shown in dotted lines in this figure. That is, the worm gear 24 and associated parts are on the other side of the filter away from the hollow trunnion 15 and pipe 17.

When the motor 21 is started, vacuum applied to the pipe 17 and liquid containing solid matter is placed within the tank 18, liquid is drawn inwardly through the filter fabric 12' into the chambers 13, from whence it passes by pipes 14 into the discharge pipe 17. At the same time a layer of solid material builds up upon the filter fabric 12'. This deposit is sucked dry by means of air entering through it into the chambers 13. The rotation of the drum takes place in the direction of the arrow shown in Fig. 1, and to continue filtering it is necessary to remove the solid deposit from the filter. This may suitably be effected by means of a knife 25, to which the present invention particularly relates.

It will be understood that there are many kinds of rotary filters and that I do not intend to be limited to the particular type of filter described herein, since my invention is applicable generally to any appropriate type of rotary filter.

In a preferred operation of a rotary filter such as has been described so far, a suitable precoat is first built up upon the filter fabric 12'. This precoat may be of any known or suitable type and the particular precoat employed for any particular purpose will depend upon various considerations, such as price at the locality, inertness of the pre-coat and the beneficial effects which are necessary in the case of the specific filtration. Among the precoat materials which may be used are various foraminous and granular materials such as some clays, fuller's earth, diatomaceous earth and the like. The precoat may suitably be built up upon the filtering surface of the drum before the main filtration operation and one convenient way of doing this is to supply a slurry or suspension of the precoat to the tank 18 and operate the filtration process until the desired thickness of precoat is attained. When this is being done, the knife 25 should be retracted in a manner which will be more readily understood hereinafter.

The knife 25 may suitably comprise a sharpened blade which extends across the face of the drum 10 at a point where the periphery of the drum is descending into the liquid in the tank 18. The blade 25 is so located that the material which it shaves or skins from the periphery of the drum 10, falls clear of the tank 18 into any suitable receptacle (not shown), therebeneath. The blade 25 is preferably supported on a plurality of fingers 26 which are rigidly mounted upon a bar 27. The bar 27 is rotatably mounted on a plurality of bearings 28 which are rigidly supported on a cross beam 29 which extends from one side of the filter to the other. The beam 29 is supported at both ends by means of legs 30 which are rigidly mounted upon the frame 19.

At one end the bar 27 has rigidly mounted thereon a lever 31 which extends downwardly. At its lower end the lever 31 carries a forked member 32 having bifurcations one on each side of a bar 33. Each of the bifurcated members of the forked member 32 is provided with a slot 34, which slots extend in the axial direction of the lever 31. The slots 34 receive pins 35 which project laterally from the bar 33. The bar 33 is mounted in bearings 36 for free sliding movement in the longitudinal direction. The bar 33 is held against rotation by suitable means, for example, by means of set screws 37 carried by the bearings 36 which extend into key-ways 38 in said bar. The bearings 36 are suitably supported from a base 39 which is rigidly mounted on the frame 19. Between the forked member 32 and the adjacent bearing 36 the bar 33 is surrounded by a coil spring 40 which abuts against said bearing 36 and against a washer 41 held in fixed position on the bar 33 by means of an adjustable nut 42 threadedly mounted thereon. It will be seen from Figs. 1 and 2 that the spring 40 forces the bar 33 to the left and tends to move the knife 25 away from the filtering fabric 12'.

Between the bearings 36 the bar 33 has rigidly mounted thereon a roller 43. This roller is adapted to engage a cam 44 rotatably mounted on a shaft 45 rotatably mounted on a bearing 52. A clutch member 53 is slidably and non-rotatably mounted on the shaft 45 and is adapted to be actuated by a lever 54. By means of this lever the clutch member 53 may be brought into and out of operative engagement with a complementary clutch member 55, which is rigidly mounted on a shaft 56 which is in alignment with the shaft 45. The shaft 56 is the output shaft of a gear reducing mechanism 46 which is also mounted on the frame 19. The input shaft 47 carries a sprocket wheel 48 over which runs a chain 49. This chain 49 rides on a large sprocket wheel 50 which is mounted on the trunnion 15. When the drum 10 rotates, the sprocket wheel 48 is rotated by the chain 49. The result is that shaft 56 and, when the clutch members 53 and 55 are engaged, the cam 44, are rotated at a very slow speed, this rotation occurring in the clockwise direction, as viewed in Fig. 2. The cam rotating in the direction indicated and riding on the roller 43, which is pressed against it by the spring 40, the roller 43 and consequently the bar 33 is progressively forced to the right while the drum 10 is being rotated. This movement is very slow and it results in a still slower movement of the knife 25 toward the filtering surface 12 and the material deposited thereon. It is ordinarily preferred that the movement of the knife 25 towards the drum 10 should not exceed 0.005 inch per revolution of the drum. The movement of the knife 25 towards the filtering surface of the drum continues progressively until the roller 43 arrives at the fall 51 of the cam 44, a condition which is imminent in Fig. 2. A further slight rotation of the cam 44 from the position shown in Fig. 2 allows the roller 43 to ride down the cam fall 51 under the influence of the spring 40. This movement causes the knife 25 to move away from the filter drum so that a new precoat layer may be built up thereon.

The clutch member 53 carries an integral pinion 57 which is brought into engagement with a pinion 58 rigidly mounted on a shaft 59. The shaft 59 is mounted in a bearing 60 and is provided with a hand wheel 61. When the clutch members 53 and 55 are brought into engagement the pinions 57 and 58 are disengaged. It will thus be seen that the cam 44 may be automatically driven by the rotation of the filter drum or they may be manually actuated by means of the wheel 61.

It will be understood that the highest point on the cam 44 is such that the knife 25 does not come into contact with the fabric 12', injury thereto being thereby avoided.

The operation is as follows: The knife 25 being at approximately its farthest position from the drum 10, with the bar 33 in its extreme left position, as viewed in Fig. 1, the roller 43 rests firmly against the lowest part of the cam 44. The clutch lever 54 is thrown to disengage the clutch members and a slurry of a suitable precoat material is applied to the tank 18, vacuum is applied to the pipe 17 and the motor 21 is started so that the drum 10 rotates. The liquid part of the slurry is drawn through the filter fabric 12' and passes away through pipe 17. The precoat material builds up as a deposit on the peripheral surface of the drum 10. This operation is continued until the precoat layer has attained a suitable size, for example, a thickness of 1" or 1¼", which brings the surface of the precoat layer close to the cutting edge of the knife 25. The slurry then drained from the tank 18 and the knife 25 slowly advanced by the hand wheel 61 until the precoat layer is shaved and trued by the knife. The material to be filtered is now supplied to the tank 18 and the lever 54 is thrown to engage the clutch members and disengage the pinions 57 and 58. With continued rotation of the drum 10, the cam 44 is slowly rotated with the result that the knife 25 moves very slowly towards the filtering surface of the drum 10. As indicated above, this movement preferably does not exceed 0.005 inch per revolution of the drum 10. The result is that the material being filtered, which builds up as a deposit on the drum 10 as the drum rotates, is continuously removed by the knife 25 and in addition to the solid material being filtered, a thin layer, ordinarily not exceeding 0.005 inch of precoat is also removed. In this way a new surface of precoat is always presented to the liquid in the tank 18. This continues until the roller 43 runs past the fall 51 of the cam 44, whereupon the knife 25 returns to its most remote position with respect to the drum 10. When this occurs the precoat layer should be built up again in the manner above described.

It is to be noted that the cam 44 is actuated continuously with the rotary element of the filter during the filtering operation. The cam 44 is contoured so that the knife 25 feeds substantially uniformly and at a very slow rate towards the filtering surface. As a result of this structure the knife takes a fine cut in the form of a spiral and the knife is held rigid in cutting position without any tendency to vibrate. A new precoat surface is thereby presented to the liquid in the tank 18 and high filtering efficiency is maintained through the whole filtering operation.

Although the invention has been disclosed in connection with the specific details of a preferred embodiment thereof, it must be understood that such details are not intended to be limitative of the invention except in so far as set forth in the accompanying claim.

Having thus described my invention, what I claim as new and desire to secure by Letters Patent of the United States is:

A filter comprising a rotary drum, the cylindrical periphery of which is the filtering surface, a knife extending across said surface, means providing a suspended pivotal mounting for said knife, a long lever for actuating said knife to cause it gradually and continuously to approach the filtering surface, a slidable bar engaging said lever, resilient means on said bar tending to move the knife away from the filtering surface, a cam having a steep fall for moving the knife gradually and continuously towards the filtering surface and permitting the spring to retract it rapidly, and a drive including a speed reduction unit for driving said cam from the drum.

HOWARD D. GRANT.

CERTIFICATE OF CORRECTION.

Patent No. 2,072,586.      March 2, 1937.

HOWARD D. GRANT.

It is hereby certified that error appears in the printed specification of the above numbered patent requiring correction as follows: Page 2, second column, line 30, for the word "applied" first occurrence, read supplied; and that the said Letters Patent should be read with this correction therein that the same may conform to the record of the case in the Patent Office.

Signed and sealed this 6th day of April, A. D. 1937.

(Seal)      Henry Van Arsdale
Acting Commissioner of Patents.

and high filtering efficiency is maintained through the whole filtering operation.

Although the invention has been disclosed in connection with the specific details of a preferred embodiment thereof, it must be understood that such details are not intended to be limitative of the invention except in so far as set forth in the accompanying claim.

Having thus described my invention, what I claim as new and desire to secure by Letters Patent of the United States is:

A filter comprising a rotary drum, the cylindrical periphery of which is the filtering surface, a knife extending across said surface, means providing a suspended pivotal mounting for said knife, a long lever for actuating said knife to cause it gradually and continuously to approach the filtering surface, a slidable bar engaging said lever, resilient means on said bar tending to move the knife away from the filtering surface, a cam having a steep fall for moving the knife gradually and continuously towards the filtering surface and permitting the spring to retract it rapidly, and a drive including a speed reduction unit for driving said cam from the drum.

HOWARD D. GRANT.

CERTIFICATE OF CORRECTION.

Patent No. 2,072,586.                                                    March 2, 1937.

HOWARD D. GRANT.

It is hereby certified that error appears in the printed specification of the above numbered patent requiring correction as follows: Page 2, second column, line 30, for the word "applied" first occurrence, read supplied; and that the said Letters Patent should be read with this correction therein that the same may conform to the record of the case in the Patent Office.

Signed and sealed this 6th day of April, A. D. 1937.

(Seal)                                                            Henry Van Arsdale
Acting Commissioner of Patents.

CERTIFICATE OF CORRECTION.

Patent No. 2,072,586.                                                   March 2, 1937.

HOWARD D. GRANT.

It is hereby certified that error appears in the printed specification of the above numbered patent requiring correction as follows: Page 2, second column, line 30, for the word "applied" first occurrence, read supplied; and that the said Letters Patent should be read with this correction therein that the same may conform to the record of the case in the Patent Office.

Signed and sealed this 6th day of April, A. D. 1937.

(Seal)                                            Henry Van Arsdale
                                                Acting Commissioner of Patents.